April 26, 1938.  H. G. TREMMEL  2,115,675

FLOW REGULATOR

Filed Oct. 8, 1937

INVENTOR.
Henry G. Tremmel
BY Hull Buck o West
ATTORNEY.

Patented Apr. 26, 1938

2,115,675

UNITED STATES PATENT OFFICE 2,115,675

FLOW REGULATOR

Henry G. Tremmel, Cleveland, Ohio, assignor to The North American Fibre Products Company, Cleveland, Ohio, a corporation of Ohio Application October 8, 1937, Serial No. 167,949

1 Claim. (Cl. 251—92)

This invention relates to a measuring valve for regulating the flow of fluid as between two vessels or through a pipe line and has particular reference to that type of measuring which is accomplished by a closely regulated adjustment of the size of the orifice through which the fluid must pass. While the invention has a wide range of application, being adaptable to all sorts of fluids passing under the influence of gravity or pressure, it has been worked out with particular reference to use in a system for feeding a rust and scale preventing fluid into a water line, the water pressure being balanced with respect to the container for the compound so that the rust and scale preventing liquid flows under the influence of relatively small force. It is to be understood that the valve is not limited to this use but is adapted for various uses.

Accordingly, the principal object of the invention is to provide a measuring valve of the type indicated above which shall be extremely simple and suitable for operation and maintenance by relatively unskilled persons. More specifically, an object is to provide a valve of this character having novel means for cleaning the orifice in the event of the same becoming clogged or partially clogged.

Limited objects leading to the attainment of the above indicated objects are the provision of a valve body having an extremely close fitting rotor working therein; the provision of separate metals for the valve body and rotor, the former preferably being of brass and the latter of hardened stainless steel; the provision of novel packing means for the joint between the rotor and the valve body; the provision of a simple and effective construction for the removal of the rotor in case replacement should become necessary and novel means for attachment of an indicating pointer to such rotor without in any way rendering the disassembling of the device more difficult.

Figure 1:
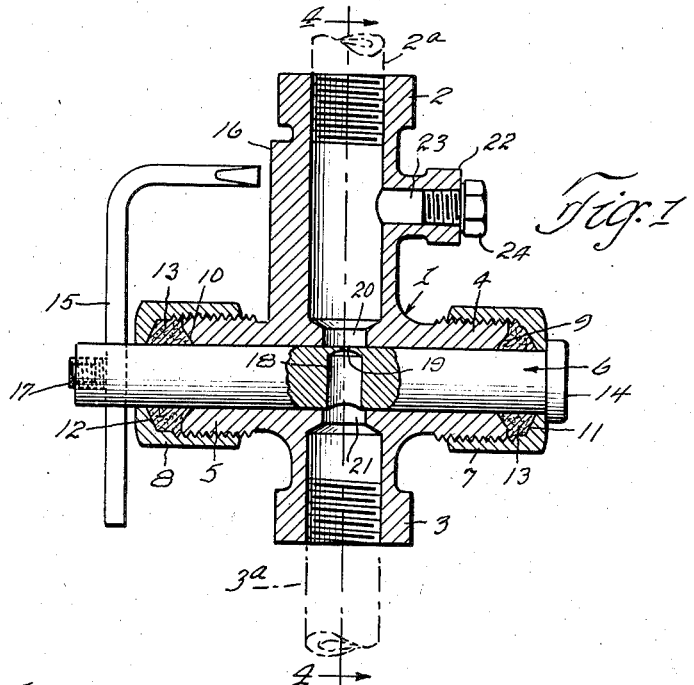
Figure 2:
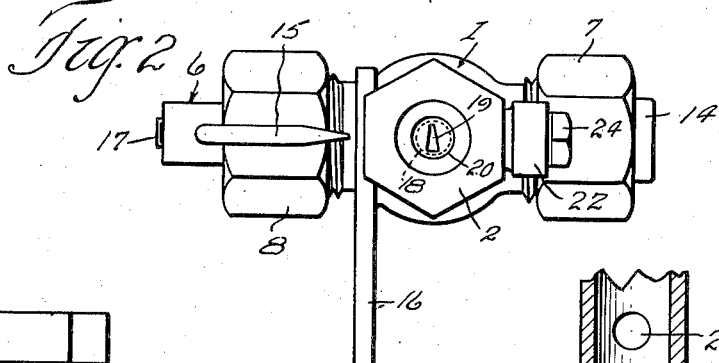
Figure 3:
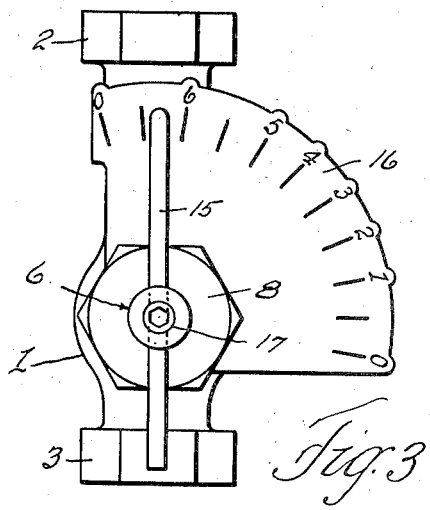
Figure 4:
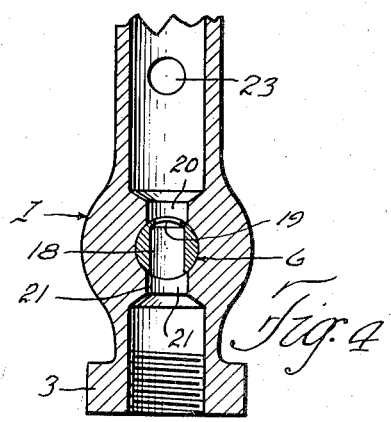

Other and more limited objects will be in part apparent and in part pointed out in connection with the accompanying drawing wherein Fig. 1 is a sectional view taken centrally through a device embodying my invention; Fig. 2 is a top plan view thereof; Fig. 3 is an end elevation looking from left to right in Fig. 1; and Fig. 4 is a section on the line 4—4 of Fig. 1.

In the drawing the numeral 1 indicates generally a valve body preferably composed of brass and being provided with pipe receiving bosses 2 and 3 for receiving inlet and outlet pipes 2ª and 3ª respectively and bosses 4 and 5 internally drilled to receive the valve rotor 6 and externally threaded to receive packing nuts 7 and 8. It will be noted that the ends of the bosses 4 and 5 are concave as indicated at 9 and 10 while the inner faces of the packing nuts 7 and 8 are similarly concave as indicated at 11 and 12. This enables packing material 13 received between said concave faces to be urged into sealing relation to the rotor 6 by a relatively small tightening of the said nuts. The rotor 6 is provided with a shouldered portion or head 14 which is adapted to engage the outer face of the packing nut 7 to limit motion of the rotor 6 axially toward the left as seen in Fig. 1. Extending diametrically through the rotor 6 at the left hand end is a pointer 15 which is held in position with respect to said rotor and a scale 16 by means of a set screw 17 received in the left hand end of the rotor 6.

Extending diametrically through the rotor 6 is a passage for fluid made up of a relatively large bore 18 and drilled almost through the said rotor, and a small wedge-shaped opening 19 extending the remainder of the way through such passage. The bore 18 terminates in a curved bottom wall of a curvature approximating that of the outer surface of the rotor 6 so as to leave a very thin wall in which the wedge shaped opening 19 is formed. It will be noted that the passage made up of the openings 18 and 19 registers with passages 20 and 21 in the valve body 1 so that the passage is large with the exception of the wedge-shaped opening 19.

In the operation of the device, fluid passes from the inlet pipe 2ª through the opening 20 in the valve body and then through the wedge-shaped opening in the thin wall at the end of the bore 18 which forms the restricting influence and then freely through the bore 18 and the opening 21 to the pipe 3ª. Inasmuch as the rotor 6 has a very close working fit with the valve body at the opening 20, it will be clear that in the event of foreign material clogging the opening 19, a rotation of the pointer 15 in a direction to move the wide end of the wedge-shaped opening 19 in advance of the pointed end thereof may be made use of for the purpose of shearing off any projecting portion of such foreign material. Since the portion thus sheared off is the portion of the foreign material which did not pass through the opening and prevented the passage of the entire particle therethrough, the portion left in the opening 19 will be rather smaller than such opening itself. The result is that upon further rotation in the same direction the bore 18 will be brought into register with the passage 20, resulting in dislodging the particle of foreign material from the opening 19 by reversal of the positions of the bore and opening with respect to the passages 20 and 21. It thus appears that by simply rotating the pointer 15 from the position at which it has been set one or more complete turns, the cleaning can be accomplished. The operator, even though he be not sufficiently trained to understand the reason therefor may be instructed to rotate the element 15 one complete turn at stated periods. This will result in keeping the device free from clogging and is a very simple method of keeping the passage open through a measuring valve. A cleanout opening 23 is provided in a boss 22 extending from the valve body 1 and is normally closed by the plug 24. When a quantity of foreign material has accumulated in the passage portion 20 sufficient to interfere with normal operation of the device, fluid may be passed through from the passage portion 21, through the passage portion 20 and out through the opening 23, this being a reversal of normal direction of fluid flow.

From the foregoing it will be clear that I have provided a device which is well adapted for its intended purposes and while I have shown and described the preferred present embodiment of my invention I wish it understood that I am not limited to the details of the disclosure but only in accordance with the appended claim.

Having thus described my invention, what I claim is:

A valve for allowing passage of a predetermined quantity of fluid, the same comprising, in combination, a valve body having an inlet passage and an outlet passage, a closely fitting rotor working therein and having a passage therethrough adapted to register with the said inlet and outlet passages, the rotor passage being made up of a relatively large bore extending diametrically from one side of said rotor nearly to the opposite surface, leaving a thin wall, and a wedge shaped opening formed in said thin wall and having its greatest dimension extending circumferentially of said rotor, said bore being formed with a curved bottom of a curvature approximating that of the surface of said rotor, and means for rotating said rotor, thereby to bring the passage and the opening thereof into register with either of the passages in the valve body.

HENRY G. TREMMEL.